United States Patent Office 2,732,022
Patented Jan. 24, 1956

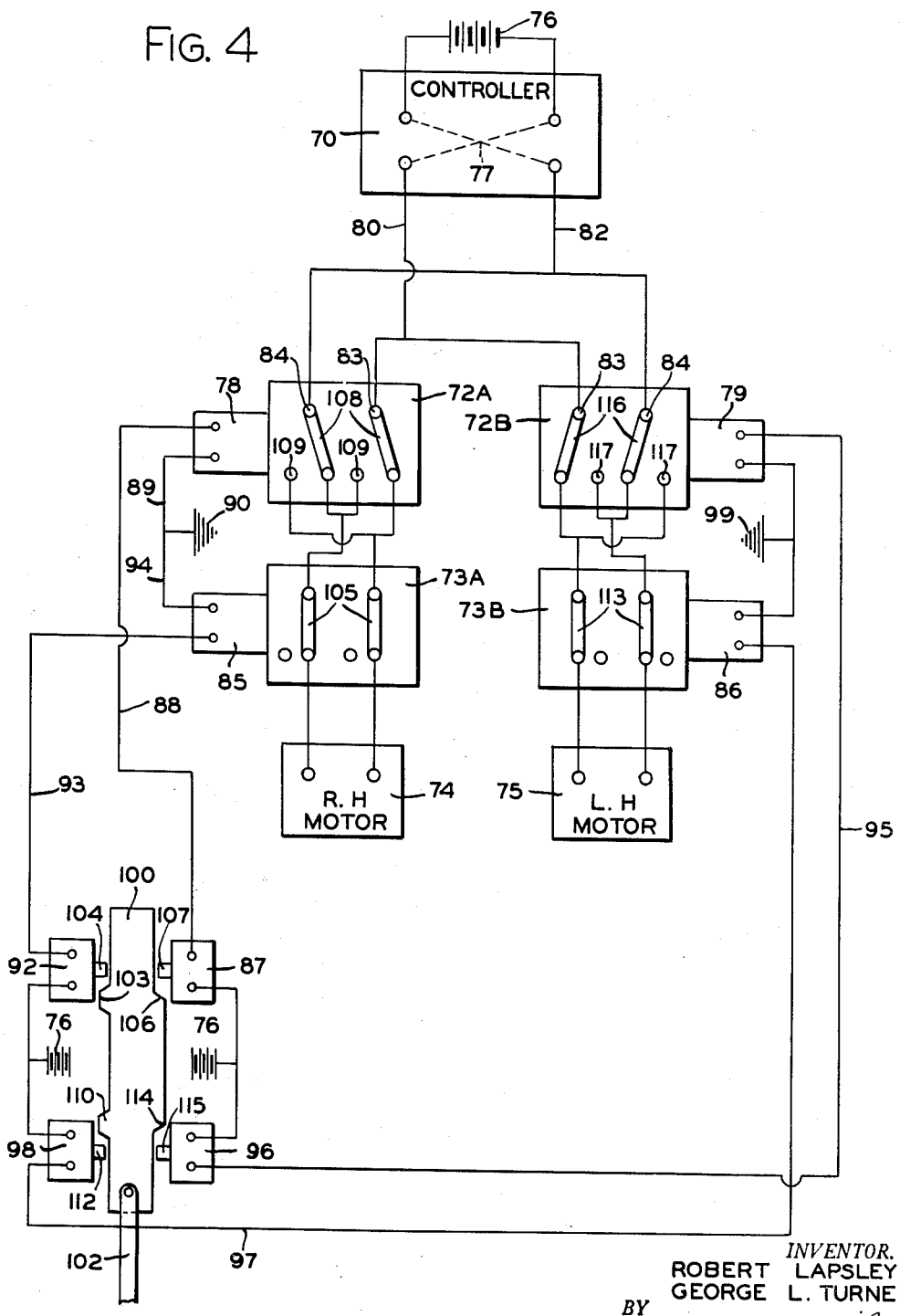

2,732,022

STEERING CONTROL MEANS FOR ELECTRIC MOTOR DRIVEN VEHICLE WHEELS

Robert Lapsley, Berrien Springs, and George L. Turner, Niles, Mich., assignors to Clark Equipment Company, Buchanan, Mich., a corporation of Michigan Application December 2, 1949, Serial No. 130,622

5 Claims. (Cl. 180—6.28)

This invention relates to industrial trucks and, more particularly, is directed to a steering or control system for industrial trucks and other similar vehicles. As illustrated and described herein this system is embodied in a boom type industrial truck but it will be readily understood by those familiar with vehicles of this type that the present system may be used also in other vehicles.

The normal slewing boom type industrial truck has numerous disadvantages in that the control systems for control of the boom and its appurtenances are quite complicated and require expensive and costly apparatus to control the operation of the boom. Moreover, trucks of the fixed boom type have usually not been satisfactory because of their lack of maneuverability, preventing the truck from being utilized in a relatively small area.

The present control system is intended to provide an industrial truck or other vehicle with a very short turning radius whereby the truck can pivot about the mid point between the drive wheels. Thus, using a fixed boom type industrial truck as an example, such a vehicle can have all the maneuverability provided by a slewing boom without requiring the expensive and complicated controls.

Still another advantage of the present invention is that the control of the pivoting movement of the truck can be accommodated entirely by the operator's control of the steering wheel, requiring no complications since the operator, in his normal actuation of the steering wheel, effects the pivoting movement of the truck without any ancillary controls.

The present invention also has the distinct advantage of providing a cushion type connection between the power source and the driving wheels to avoid any abrupt changing of direction of the vehicle or any rough acceleration, thereby insuring that the load upon the crane arm or boom will not be caused to swing unduly while the vehicle changes speeds or reverses its direction of movement.

Other objects and advantages of the present invention will appear more fully from the following detailed description which, taken in conjunction with the accompanying drawings, will disclose to those skilled in the art the particular construction and operation of a preferred form of the present invention.

In the drawings,

Figure 4 is a diagrammatic circuit drawing for the drive mechanism shown in Figure 3.

Figure 1:
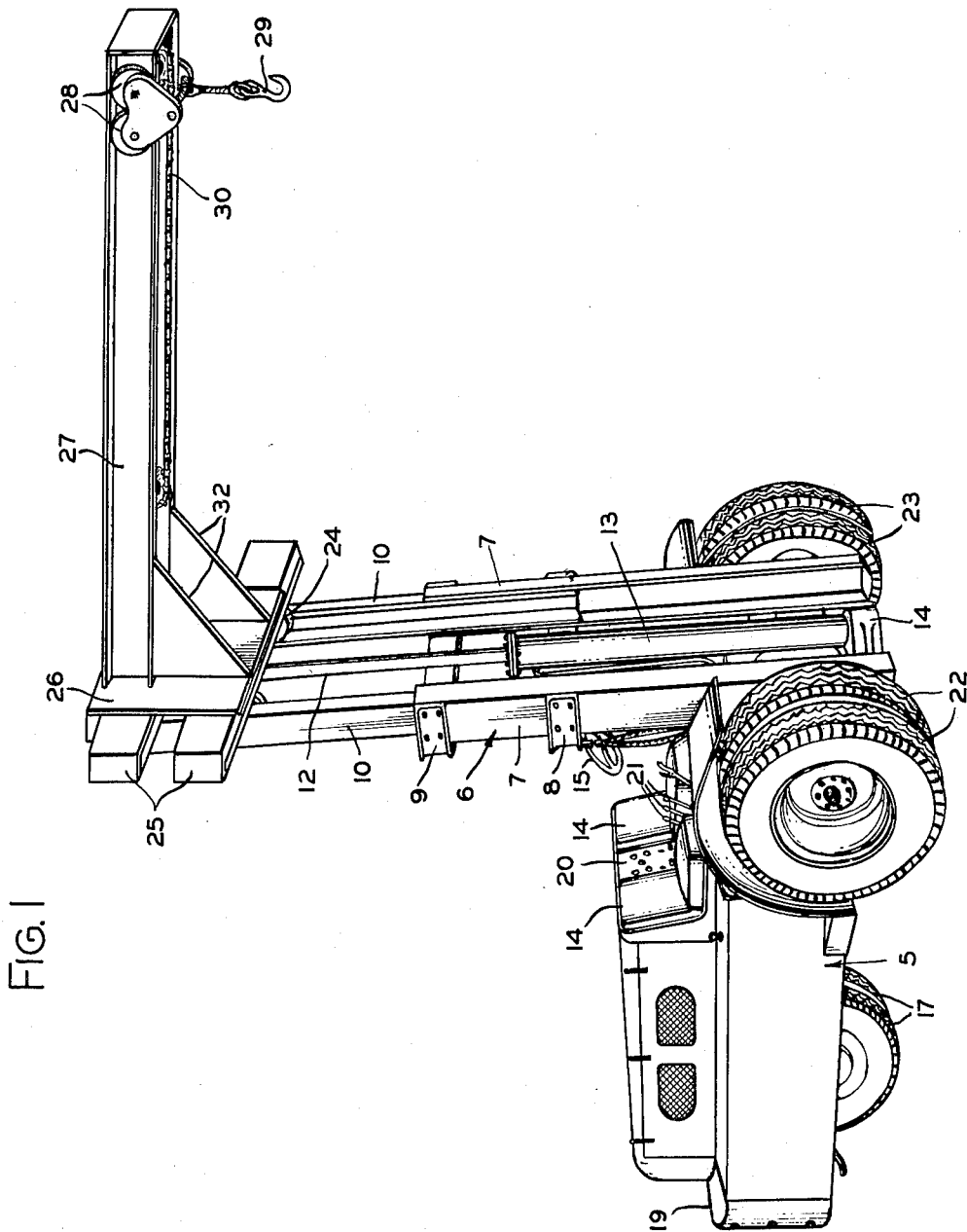
Figure 1 is a perspective view of a boom type industrial truck in which the present invention is incorporated.

Referring now in detail to the drawings, the chassis of the truck is indicated generally at 5 in Figure 1, and includes the mast or upright construction 6 consisting of stationary lower uprights 7 tied together by the cross members 8 and 9, and inner telescoping uprights 10 adapted to move vertically within the fixed uprights 7 by means of the piston 12 operating in the hydraulic cylinder 13 cradled at its lower end in the cradle member 14, supported between the lowermost ends of the fixed uprights.

Figure 2:
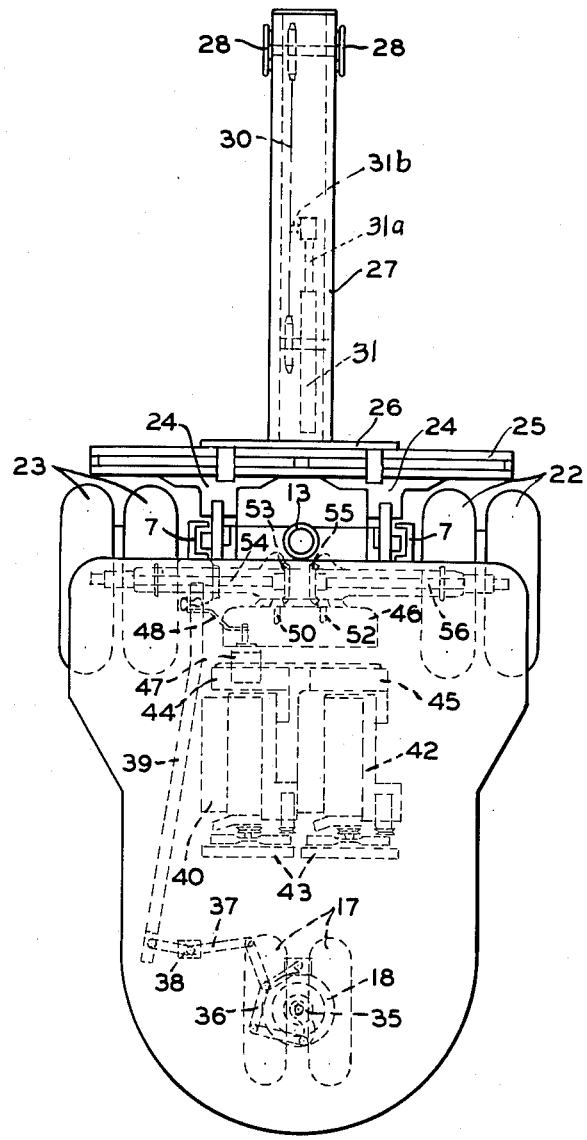
Figure 2 is a top plan view of the truck of Figure 1 showing diagrammatically one method of driving the same.

The truck chassis is provided with a pair of seats 14 and with the steering wheel 15, mounted upon the conventional type of steering tower for controlling the movement of a pair of pneumatic tired rear steering wheels 17, preferably caster mounted, as indicated at 18 in Figure 2, and supporting the rear end of the truck upon which is mounted the counterweight 19 for counterbalancing the load to be carried by the crane.

A suitable instrument panel 20 is disposed between the two seats 14 and control levers and the like, such as indicated at 21, are provided adjacent the driver's right hand.

The upright or forward end of the truck is preferably supported upon dual pneumatic tired drive wheels 22 and 23, which are arranged for application of driving torque independently thereto as will be described in detail hereinafter.

Guided for movement within the channel portions of the inner telescoping uprights 10 is a load supporting carriage partially shown at 24 in Figure 1, upon which are mounted two laterally extending bar members 25 and about which a chain is trained over sprockets carried by the cross head at the top of the piston rod (not shown) for elevating the carriage and bars 25 at twice the rate of movement of the inner uprights with respect to the fixed uprights upon admission of fluid under pressure to the lower end of the hydraulic cylinder 13. This elevating mechanism is conventional, but if a detailed description is desired such may be found in U. S. Patent 2,608,315, Turner, dated August 26, 1952, in which an elevating mechanism of this type is illustrated and described.

Projecting forwardly from the bars 25 is a supporting plate 26 to which is connected a pair of outwardly facing channel members 27 forming a guideway for a roller assembly including side plates 28 carrying the boom or crane hook 29. A suitable endless chain and sprocket arrangement is disposed between the two channel members 27, as indicated at 30, for moving the hook assembly 29 fore and aft with respect to the channels 27. This movement may be accomplished by any suitable means. In the present case an hydraulic motor comprising a cylinder 31 and piston 31a is utilized, the cylinder being mounted on a fixed portion of the device and the piston rod connected at 31b to the upper horizontal portion of the chain. With this arrangement, as the piston is extended and retracted by the application of hydraulic pressure in the cylinder the chain operates the sprockets and causes the roller assembly to move in and out on the boom assembly.

Suitable gussets or reinforcing plates 32 are provided for supporting the channels 27 and, preferably, the mechanism is adapted to tilt forwardly or rearwardly with respect to the supporting carriage 24 by means of tilt cylinders, such as described in detail in the co-pending application of one of the present inventors, George L. Turner, Serial No. 115,397, filed September 13, 1949, now Patent 2,608,315, issued August 26, 1952.

Considering now Figure 2 in detail, it will be seen that the steering wheels 17 are mounted for rotation about the shaft 35 and are actuated by means of suitable linkage connection 36 controlled by a bell crank 37 anchored intermediate its ends, as indicated at 38, and having the free end thereof connected to the drag link 39 connected to the lower end of the steering column. The type of motion effected by this linkage is similar to that described in the co-pending application of George L. Turner, Serial No. 99,779, filed June 17, 1949, now abandoned, to which reference should be made for a more complete description. Suffice it to say that with this linkage, a turning movement can be imparted to the wheels 17 to rotate them through substantially 180 degrees of movement.

Mounted within the chassis of the vehicle are two power plants 40 and 42, having the conventional radiators 43 mounted adjacent one end thereof, and at their opposite end, having housings 44 and 45 enclosing suitable electro-magnetic clutch mechanisms for providing forward or reverse drive from the engines 40 and 42 to the transmissions embodied within the housing 46. This type of drive mechanism is more fully described in our co-pending application, Serial No. 115,982, filed September 16, 1949, now Patent 2,645,296, issued July 14, 1953, and consists primarily of the electro-magnetic forward and reverse clutches in combination with planetary type transmissions controlled to provide three speeds forward or three speeds reverse, these transmissions and the clutches being automatically controlled through the control mechanism 47 connected through the link 48 to the steering drag link.

The output from the transmission 46 consists of two pinion gears 50 and 52, respectively, the pinion gear 50 being adapted to drive ring gear 53 connected to the axle shaft 54 for driving the drive wheels 23, while the pinion gear 52 is adapted to drive the ring gear 55 connected to the axle shaft 56 for driving the drive wheels 22. The operation of this mechanism is similar to that described in our Patent 2,645,296 in that upon rotation of the steering wheel through the first position of the steering movement, the control mechanism 47 automatically decreases the throttle on one of the engines to slow down the inner set of drive wheels depending upon which direction the vehicle is to be turned and, also, further rotation idles this engine and subsequently reverses the direction of torque to such set of drive wheels to allow the truck to pivot about a center substantially co-extensive with the hydraulic cylinder 13. All of this control is effected automatically upon rotation of the steering wheel 15.

The control levers 21 are for providing the various forward and reverse speeds of control, as well as for actuating the hydraulic circuit to the lift cylinder 13 and to the ancillary equipment for tilting the boom 27 or for moving the crane hook 29 inwardly or outwardly along the boom.

Figure 3:
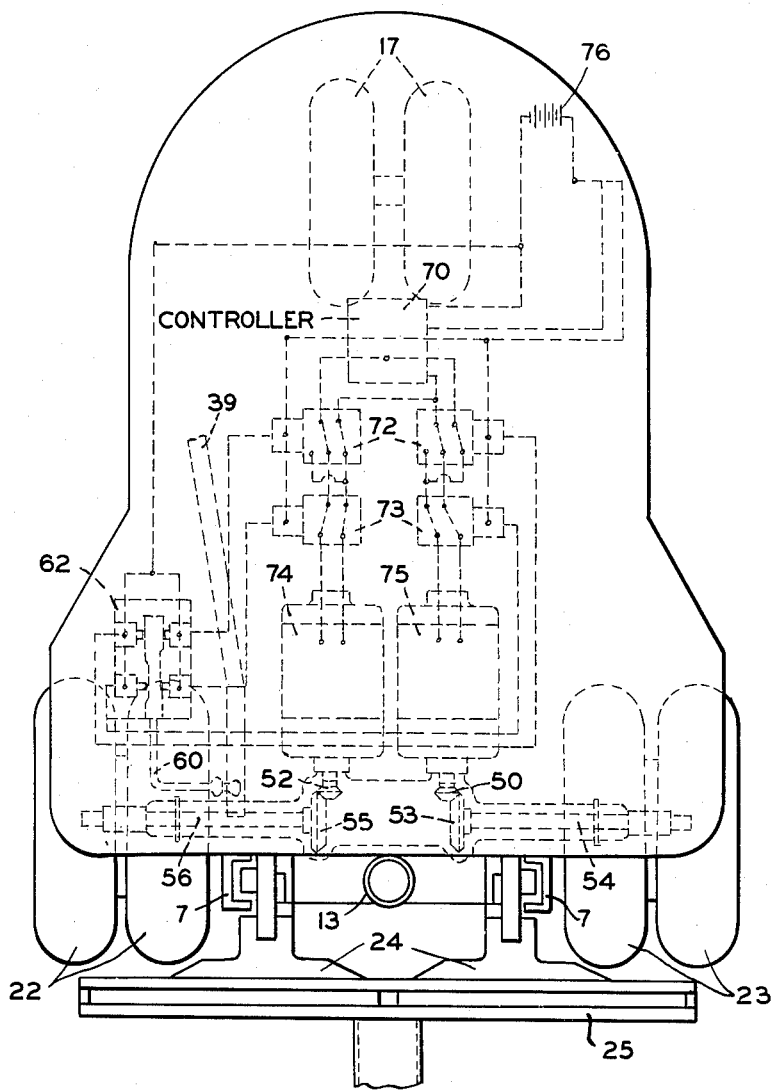
Figure 3 is a view corresponding to Figure 2 but showing a different type of driving mechanism.

In the form of the invention disclosed in Figures 3 and 4, there has been substituted for the two prime mover units 40 and 42, a battery powered electric drive type of mechanism utilizing a control system operated again from the steering drag link 39 through the control lever 60 to the switch box 62.

The electric drive control mechanism includes a controller assembly, indicated generally at 70, reversing switch mechanisms indicated generally at 72, cut-out switch mechanisms, indicated generally at 73, and the right hand drive motor 74 and the left hand drive motor 75, having the pinions 50 and 52 connected respectively thereto. The details of this circuit are illustrated more in detail in Figure 4 to which reference will now be had.

The controller mechanism 70 in Figure 4 is connected to a prime source of power, such as the electric battery 76, and contains therein the usual control mechanism for providing varying points of control, in the normal form of such controls this being three control points for low, medium, and high speed operation of the drive motors. Reversing mechanism, such as at 77, is provided in the controller box for reversing the direction of the drive motors in each of the three speed ranges. This provides flexibility of drive for the truck. This is the conventional electric battery powered truck type control and needs no further explanation.

However, in the present construction, there is interposed between the controller 70 and the motors 74 and 75, reversing switch mechanisms, indicated in Figure 4 at 72A and 72B, which are double pole, single throw switches adapted to be operated by solenoid mechanisms 78 and 79, respectively. The main conductors from the controller 70, indicated at 80 and 82, lead to the switch terminals 83 and 84, respectively, in each of the reversing switch mechanisms 72A and 72B. Through the switch blades, current is then lead into the cut-out boxes 73A and 73B, respectively, and normally passes directly through these boxes to the terminal contacts of the motors 74 and 75. The cut-out boxes 73A and 73B are also provided with solenoid controls 85 and 86, respectively. The solenoid 78 is adapted to be energized through a switch mechanism 87 which may be of the micro-switch type, and which is connected from battery 76 through the switch and the conductor 88 to the solenoid 78 and from thence through the conductor 89 to ground at 90.

The solenoid 85 is adapted to be energized by means of a second switch mechanism 92 connected to the battery 76 and connected through conductor 93 to one side of the solenoid 85, the other side being connected through conductor 94 to ground 90. Similarly, solenoid 79 is energized from conductor 95 connected to one side of the switch control 96, while solenoid 86 is energized from conductor 97 connected to one terminal of the switch 98, the solenoids 79 and 86 having common ground connection at 99.

In the operation of the drive mechanism heretofore described, the cam member 100 is connected in any suitable manner, such as by the linkage 102 corresponding to the links 60 of Figure 3, to the steering drag link 39, so that as the steering wheel of the vehicle is turned in one direction or the other, the cam member 100 is reciprocated within the switch box 62 to effect selective action of the solenoids 78, 79, 85, and 86.

Considering now that it is desired to turn the vehicle to the right, the cam member 100 is moved upwardly with respect to the position in which it is shown in Figure 4. Initial turning action, therefore, moves the cam surface 103 into contact with the switch plunger 104 of switch 92. This energizes the switch, thereby closing the circuit from the battery through conductor 93 to solenoid 85. Energization of solenoid 85 moves the switch blades 105 of the cut-out in box 73A to the left, as viewed in Figure 4, thereby opening the circuit between the main controller assembly and the right hand motor, thus stopping the motor and deenergizing the driving of wheels 22.

Further steering movement results in further upward movement of the cam 100, thereby causing surface 106 to engage plunger 107 of switch 87 which, in turn, energizes solenoid 78, causing the switch blades 108 of the reversing switch 72A to be shifted to the left into contact with the alternate terminals 109 in box 72A. This reverses the direction of current flow from the controller to the cut-out box 73A. As the cam plate 100 is moved still further upwardly due to further rotation of the steering controls, the plunger 104 of switch 92 drops off the cam surface 103, thereby de-energizing switch 92 which, in turn, de-energizes solenoid 85 while retaining solenoid 78 energized. De-energization of solenoid 85 results in the switch blades 105 of the cut-out switch being restored to the position shown in full lines in Figure 4, thereby reconnecting the controller to the right hand motor 74 with the current flowing in the opposite direction. This produces a reverse drive in the motor 74, causing the wheels 22 to be driven in a reverse direction and thus causing the truck to pivot about a point located centrally between the wheels 22 and 23, thereby producing a very short pivoting action of the truck about the lift cylinder 13 as an approximate center.

It will be noted that with the construction thus described, the cut-out switch first de-energizes the motor 5 before the reversing switch is shifted and then reconnects the motor to the reversing switch in its reversed position for reconnecting the electric power to the motor.

As the vehicle is again steered toward a straight position the plate 100 will move downwardly, causing switch 92 to be again energized by plunger 104 riding over cam 103, thereby re-energizing the solenoid 85 to actuate the cut-out switch 73A, de-energizing the right hand drive motor 74. Further straightening movement of the steering wheels will then draw the cam member 100 down further, causing plunger 107 to drop off cam surface 106, deenergizing solenoid 78 and restoring the reversing switch to its original position.

Subsequent to this time, plunger 104 drops off cam surface 103, again de-energizing switch 92 and cutting out solenoid 85 which recloses the circuit to the drive motor. The drive connections to the motor 74 have thus been restored to their original position from the reversed position, all of this being accomplished automatically without any attention on the part of the driver due to the connections between the control circuit and the steering mechanism.

When it is desired to make a left hand turn, the same operations occur in connection with switches 96 and 98 and solenoids 79 and 86. In this case, initial turning movement causes the cam 110 to move into engagement with plunger 112 of switch 98, energizing this switch to energize solenoid 86 for opening the cut-out 73B, disconnecting the motor 75 from the control circuit. This is caused by the solenoid pulling the two switch blades 113 to the right. As turning movement continues, cam 100 continues to move downwardly and cam surface 114 engages plunger 115 of switch 96, energizing this switch to energize solenoid 79, thus actuating the reversing switch blades 116 into engagement with the alternate contacts 117 thus reversing the direction of flow of current from the controller into the cut-out switch box 73B.

Further steering movement produces further downward movement of cam 100, causing plunger 112 to drop off the cam surface 110, de-energizing switch 98 and its associated solenoid 86, thereby restoring the cut-out switch 73B to circuit-closed position, closing the circuit from the controller through the reversed contacts in reversing switch 72B to the left hand motor 75, whereby this motor drives the wheels 23 in a reverse direction.

The reverse of this action occurs sequentially as the steering means is restored to normal straight line steering position as has been described in connection with the right hand motor. It will be seen that in either direction of turning, the motor driving the inside wheel is first de-energized by actuation of the cut-out switches, either 73A or 73B, depending upon the direction of turn; the circuit is then reversed through the reversing switches 72A or 72B, and the circuit is then restored to provide the reverse drive on the selected wheel.

As the steering mechanism is again straightened out, the circuit is again broken with the reversing switch restored to its original position and the circuit reclosed to restore the driving motor to its normal drive condition. This action occurs only when the steering motion exceeds a predetermined amount which is more than that normally used in driving on roadways or the like. Under normal conditions, the controller 70 controls the speed at which the wheels are driven and, through the reverse mechanism 77, provides for either forward or reverse drive of both motors simultaneously. However, when swinging movement of the truck, or pivoting movement within its own length is desired, such as when the crane is picking up a load and moving the load to one side or the other, the steering mechanism controls the reversing of the seleced motor to insure the pivoting action.

While the circuit shown in Figure 4 is relatively diagrammatic, its counterparts will be found in Figure 3 which discloses the positioning of the mechanism with respect to the general truck chassis. However, for the purpose of clarity in considering the operation of the drive mechanism, reference should be had to Figure 4.

This simplified electric control system has the advantage of being automatically operable under the control of the steering mechanism and requires no other attention on the part of the operator.

We are aware that various modifications may be made in certain details of the present construction and we therefore do not intend to be limited except as defined by the scope and spirit of the appended claims.

We claim:
1. For use with an electric truck having independent forward drive wheels at one end thereof, and steering means adjacent the opposite end of the truck, a control circuit comprising an electric motor connected to and driving each of the drive wheels, a source of electrical potential, an electrical circuit between said source of electrical potential and said motors, solenoid actuated switch means interposed in said circuit for independently reversing the flow of current to said motors, solenoid actuated switch means interposed in said circuit for independently interrupting the flow of current to said motors, cam actuated switch means having connection with said solenoid actuated switch means, a cam for actuating said last named switch means responsively to rotary movement of the steering means for actuating certain of said cam actuated switch means, and the said cam actuated switch means being connected to the said solenoid actuated switch means in a manner such that the flow of current to the motor at the drive wheel on the inside of the direction of turn is successively interrupted and reversed as the steering means moves from a neutral position toward one extreme of its operating range.

2. A control system for vehicle having at least two independent drive wheels adjacent one end of the vehicle, steering means adjacent the other end of the vehicle, and separate electroresponsive means arranged respectively for the operation of the independent drive wheels, the control system comprising connections to a source of electrical potential, first circuit means connecting the source to one of the electroresponsive means, second circuit means connecting the source to the other electroresponsive means, a pair of electrically actuated switches interposed respectively in the said first and second circuits for reversing the flow of current in the respective circuits, a second pair of electrically actuated switches interposed respectively in the said first and second circuits for interrupting the flow of current in the respective circuits, a plurality of switches arranged for operation responsively to the movement of the steering means, and circuit means connecting the said plurality of switches to the said pairs of electrically actuated switches in a manner such that the flow of the current to the electroresponsive means controlling the drive wheel on the inside of the direction of turn is successively interrupted and reversed as the steering means moves from a neutral position toward one extreme of its operating range.

3. A control system for a vehicle having two independent drive wheels adjacent one end of the vehicle, steering means adjacent the other end of the vehicle, and sparate electric motors arranged respectively for the operation of the independent drive wheels normally in the same direction, the control system comprising connections to a source of electrical potential, first circuit means connecting the source to one of the motors, second circuit means connecting the source to the other motor, a pair of electrically actuated switches interposed respectively in the first and second circuits for reversing the flow of current to the motors, a second pair of electrically actuated switches interposed respectively in the said first and second circuits for interrupting the flow of current to the said respective motors, two additional pairs of switches arranged for operation responsively to the movement of the steering means, one additional pair being operated in sequence by movement of the steering means from its neutral position toward one extreme of its operating range and the other additional pair being operated sequentially by the movement of the steering means from the neutral position toward the other extreme of the operating range, both of the said additional pairs of switches being arranged in a manner such that the first switch of each such pair operates before the second switch operates and then is restored to its initial condition after operation of the second switch, and additional circuit means connecting the first switch of each additional pair respectively to the said interrupting switch and the second switch of each additional pair respectively to the corresponding reversing switch, whereby as the steering means is operated a predetermined amount from its neutral position in steering the vehicle the motor controlling the drive wheel on the inside of the direction of turn is successively stopped and reversed, thus stopping and reversing the inside drive wheel in order to provide the vehicle with a very short turning radius.

4. A vehicle comprising at least two independent drive wheels adjacent one end of the vehicle, steering means adjacent the other end of the vehicle, separate electroresponsive means arranged respectively for the operation of the independent drive wheels, and a control system having connections to a source of electrical potential, first circuit means connecting the source to one of the electroresponsive means, second circuit means connecting the source to the other electroresponsive means, a pair of electrically actuated switches interposed respectively in the said first and second circuits for reversing the flow of current in the respective circuits, a second pair of electrically actuated switches interposed respectively in the said first and second circuits for interrupting the flow of current in the respective circuits, a plurality of switches arranged for operation responsively to the movement of the steering means, and circuit means connecting the said plurality of switches to the said pairs of electrically actuated switches in a manner such that the flow of current to the electroresponsive means controlling the drive wheel on the inside of a turn resulting from an operation of the steering means is successively interrupted and reversed as the steering means moves from a neutral position toward one extreme of its operating range.

5. A vehicle comprising at least two independent drive wheels adjacent one end of the vehicle, steering means adjacent the other end of the vehicle, separate electric motors arranged respectively for the operation of the independent drive wheels normally in the same direction, a battery for providing electrical potential, first circuit means connecting the battery to one of the motors, second circuit means connecting the battery to the other motor, a pair of electrically actuated switches interposed respectively in the said first and second circuits for reversing the flow of current to the motors, a second pair of electrically actuated switches interposed respectively in the said first and second circuits for interrupting the flow of current to the said respective motors, two additional pairs of switches arranged for operation responsively to the movement of the steering means, one additional pair being operated in sequence by movement of the steering means from its neutral position toward one extreme of its operating range and the other additional pair being operated sequentially by the movement of the steering means from the neutral position toward the other extreme of the operating range, and additional circuit means connecting the said first switch of each additional pair respectively to the said interrupting switches and the second switch of each additional pair respectively to the corresponding reversing switch, whereby as the steering means is operated a predetermined amount from its neutral position in steering the vehicle the motor controlling the drive wheel on the inside of the direction of turn is successively stopped and reversed, thus stopping and reversing the inside drive wheel in order to provide the vehicle with a very short turning radius.

References Cited in the file of this patent
UNITED STATES PATENTS

| | | |
|---|---|---|
| 1,020,707 | Lemp | Mar. 19, 1912 |
| 1,025,287 | Mattson | May 7, 1912 |
| 1,283,211 | Kintzing | Oct. 29, 1918 |
| 1,635,338 | Otterson | July 12, 1927 |
| 2,362,636 | Joy | Nov. 14, 1944 |
| 2,393,324 | Joy | Jan. 22, 1946 |
| 2,393,618 | Edwards et al. | Jan. 29, 1946 |
| 2,393,621 | Adams | Jan. 29, 1946 |
| 2,571,180 | Ball et al. | Oct. 16, 1951 |